United States Patent
Pedersen (10) Patent No.: US 6,627,666 B1
(45) Date of Patent: Sep. 30, 2003

(54) FISCHER-TROPSCH SYNTHESIS USING INDUSTRIAL PROCESS OFF GAS FEEDSTREAMS

(75) Inventor: Peter S. Pedersen, Boulder, CO (US)

(73) Assignee: Rentech Inc., Denver, CO (US)

( * ) Notice: Subject to any disclaimer, the term of this patent is extended or adjusted under 35 U.S.C. 154(b) by 201 days.

(21) Appl. No.: 09/924,262

(22) Filed: Aug. 8, 2001

Related U.S. Application Data (60) Provisional application No. 60/223,680, filed on Aug. 8, 2000.

(51) Int. Cl.$^7$ .......................... C07C 27/00; C07C 27/06
(52) U.S. Cl. ...................... 518/721; 518/706; 518/707; 518/713; 518/715; 518/717; 518/719
(58) Field of Search .............................. 518/706, 707, 518/713, 715, 717, 719, 721

(56) References Cited

U.S. PATENT DOCUMENTS

| | | |
|---|---|---|
| 5,324,335 A | 6/1994 | Benham et al. |
| 5,348,982 A | 9/1994 | Herbolzheimer et al. |
| 5,504,118 A | 4/1996 | Benham et al. |
| 5,506,272 A | 4/1996 | Benham et al. |
| 5,543,437 A | 8/1996 | Benham et al. |
| 5,620,670 A | 4/1997 | Benham et al. |
| 5,621,155 A | 4/1997 | Benham et al. |
| 5,645,613 A | 7/1997 | Benham et al. |
| 5,763,716 A | 6/1998 | Benham et al. |
| 5,824,834 A | 10/1998 | Bachtler et al. |
| 6,068,760 A | 5/2000 | Benham et al. |

OTHER PUBLICATIONS

State of the Art in GTL Technology, Report issued by Joe Verghese, Vice President Technology Oil and Gas, ABB Lumus Global, 1998.

Fischer–Tropsch Technology, report issued by the investment firm Howard, Weil, Labouissee, Friedrichs of New Orleans, author Arthur W. Tower II, Dec. 18, 1998.

Fischer–Tropsch Synthesis in the Liquid Phase, Kolbel et. al, Catal. Rev Sci. Eng. 21(2), 225–274 (1980).

Fischer–Tropsch synthesis in the slurry phase, Schlesinger, M.D. et al., Industrial and Engineering Chemistry, 43(6) 1951 pp. 1474–1479.

Keith "Gasoline from Natrual Gas," Oil and Gas Journal, Jun. 15, 1946, pp. 104–111.

Linz, "Synthesis Test," Oil and Gas Journal, Aug. 31, 1950, pp. 42–43.

Kastens, et al., "An American Fischer–Tropsh Plant," Ind. & Engr. Chem., Mar. 1952, pp. 450–466.

Riekert, et al., "Comparison of Fischer–Tropsch Reactors," Chemical Engineering Progress, Apr., 1982, pp. 86–90.

Inga et al., "Hydrodynamic and Mass Transfer Characteristics in a Large–scale Slurry Bubble Column Reactor," presented at 15th Annual International Coal Conference, Pittsburgh, PA, Sep. 1998.

"Catalytic Steam Reforming" by J.R. Rostrup–Nielsen (Haldor Topsoe A/S), Springer–Verlag Berlin Heidelberg New York Tokyo 1984.

Dry, "The Fischer–Tropsch Synthesis," Chapt. 4 in Catalyst Science Technology, Anderson & Bowland, eds. vol. 1, Springer–Verlag, (1985).

*Primary Examiner*—J. Parsa
(74) *Attorney, Agent, or Firm*—Rick Martin; Patent Law Offices of Rick Marten, P.C.

(57) ABSTRACT

A process is described in which the waste gas from the production of acetylene is employed in the Fischer-Tropsch synthesis of hydrocarbon liquids. The process consists of the steps of collecting the waste gas, compressing it to the proper pressure, passing the compressed gas into a reactor containing a Fischer-Tropsch catalyst under the proper conditions of temperature, pressure, and space velocity, and collecting the liquid products thereby formed from the waste gas stream.

41 Claims, 5 Drawing Sheets

Acetylene Plant with Acetylene Offgas-to-Fischer Tropsch Synthesis
Examples based on Rentech's FT Technology

Example 1:

Without FT Tail Gas Recycle

| AOG Feed to FT Unit: | | | FT Synthesis Liquid Products: | | | FT Tail Gas Purge: | | |
|---|---|---|---|---|---|---|---|---|
| Flow | 100 | MMSCFD | Naphtha | $C_5$-$C_9$ | 238 BPD | $H_2$ | 39.31 | MMSCFD | 59.89 mole % |
| $H_2$ | 60.2 | mole % | Diesel | $C_{10}$-$C_{19}$ | 296 BPD | CO | 6.00 | MMSCFD | 9.14 mole % |
| CO | 29.3 | mole % | Soft Wax | $C_{20}$-$C_{34}$ | 419 BPD | $CO_2$ | 12.86 | MMSCFD | 19.60 mole % |
| $CO_2$ | 3.2 | mole % | Hard Wax | $C_{35}^+$ | 722 BPD | $N_2$ | 2.00 | MMSCFD | 3.05 mole % |
| $CH_4$ | 4.9 | mole % | Total C5+ | | 1,674 BPD | $CH_4$ | 4.39 | MMSCFD | 6.68 mole % |
| $C_2$ | 0.4 | mole % | | | | $C_2H_4$ | 0.19 | MMSCFD | 0.29 mole % |
| Other ($C_3^+$, $N_2$, Ar) | 2.0 | mole % | Oxygenates | | 61 BPD | $C_2H_6$ | 0.57 | MMSCFD | 0.87 mole % |
| | 100.0 | mole % | Water | | 687 BPD | $C_3H_6$ | 0.13 | MMSCFD | 0.19 mole % |
| $H_2$/CO = | 2.1 | mole/mole | | | | $C_3H_8$ | 0.06 | MMSCFD | 0.09 mole % |
| | | | | | | $C_4H_8$ | 0.08 | MMSCFD | 0.13 mole % |
| | | | | | | $C_4H_{10}$ | 0.04 | MMSCFD | 0.07 mole % |
| | | | | | | Total | 65.63 | MMSCFD | 100.00 mole % |

Feed Pretreatment:
None.
$H_2$/CO inlet the FT reactor = 2.1 mole/mole.

Example 2:

With FT Tail Gas Recycle

| AOG Feed to FT Unit: | | | FT Synthesis Liquid Products: | | | FT Tail Gas Purge: | | |
|---|---|---|---|---|---|---|---|---|
| Flow | 100 | MMSCFD | Naphtha | $C_5$-$C_9$ | 564 BPD | $H_2$ | 5.87 | MMSCFD | 45.68 mole % |
| $H_2$ | 60.2 | mole % | Diesel | $C_{10}$-$C_{19}$ | 700 BPD | CO | 1.42 | MMSCFD | 11.06 mole % |
| CO | 29.3 | mole % | Soft Wax | $C_{20}$-$C_{34}$ | 991 BPD | $CO_2$ | 2.62 | MMSCFD | 20.41 mole % |
| $CO_2$ | 3.2 | mole % | Hard Wax | $C_{35}^+$ | 1,711 BPD | $N_2$ | 2.00 | MMSCFD | 15.56 mole % |
| $CH_4$ | 4.9 | mole % | Total C5+ | | 3,967 BPD | $CH_4$ | 0.75 | MMSCFD | 5.84 mole % |
| $C_2$ | 0.4 | mole % | | | | $C_2H_4$ | 0.05 | MMSCFD | 0.35 mole % |
| Other ($C_3^+$, $N_2$, Ar) | 2.0 | mole % | Oxygenates | | 144 BPD | $C_2H_6$ | 0.07 | MMSCFD | 0.53 mole % |
| | 100.0 | mole % | Water | | 1,700 BPD | $C_3H_6$ | 0.03 | MMSCFD | 0.23 mole % |
| $H_2$/CO = | 2.1 | mole/mole | | | | $C_3H_8$ | 0.01 | MMSCFD | 0.10 mole % |
| | | | | | | $C_4H_8$ | 0.02 | MMSCFD | 0.16 mole % |
| | | | | | | $C_4H_{10}$ | 0.01 | MMSCFD | 0.08 mole % |
| | | | | | | Total | 12.85 | MMSCFD | 100.00 mole % |

Feed Pretreatment:
None.
$H_2$/CO inlet the FT reactor = 1.4 mole/mole.

FIGURE 3

Acetylene Plant with Acetylene Offgas-to-Fischer Tropsch Synthesis

Examples based on Rentech's FT Technology

Example 3:

AOG Feed to FT Unit:

| | | |
|---|---|---|
| Flow | 100 MMSCFD | |
| $H_2$ | 61.8 | mole % |
| CO | 39.5 | mole % |
| $CO_2$ | 2.0 | mole % |
| $CH_4, C_2^+$ | 5.0 | mole % |
| Other ($N_2$, Ar) | 0.6 | mole % |
| $O_2$ | 0.1 | mole % |
| | 100.0 | mole % |
| $H_2/CO =$ | 2.0 | mole/mole |

Feed Pretreatment:
Hydrogenation of $O_2$ and olefins.
$H_2/CO$ inlet the FT reactor = 2.0 mole/mole.

Without FT Tail Gas Recycle

FT Synthesis Liquid Products:

| | | |
|---|---|---|
| Naphtha | $C_5$-$C_9$ | 242 BPD |
| Diesel | $C_{10}$-$C_{19}$ | 300 BPD |
| Soft Wax | $C_{20}$-$C_{34}$ | 425 BPD |
| Hard Wax | $C_{35}^+$ | 735 BPD |
| Total $C_5^+$ | | 1,702 BPD |
| Oxygenates | | 62 BPD |
| Water | | 725 BPD |

FT Tail Gas Purge:

| | | |
|---|---|---|
| $H_2$ | 40.56 MMSCFD | 62.63 mole % |
| CO | 6.10 MMSCFD | 9.42 mole % |
| $CO_2$ | 11.52 MMSCFD | 17.79 mole % |
| $N_2$ | 0.60 MMSCFD | 0.93 mole % |
| $CH_4$ | 5.39 MMSCFD | 8.32 mole % |
| $C_2H_4$ | 0.20 MMSCFD | 0.31 mole % |
| $C_2H_6$ | 0.08 MMSCFD | 0.12 mole % |
| $C_3H_6$ | 0.13 MMSCFD | 0.20 mole % |
| $C_3H_8$ | 0.06 MMSCFD | 0.09 mole % |
| $C_4H_8$ | 0.08 MMSCFD | 0.12 mole % |
| $C_4H_{10}$ | 0.04 MMSCFD | 0.06 mole % |
| Total | 64.76 MMSCFD | 100.00 mole % |

Example 4:

AOG Feed to FT Unit:

| | | |
|---|---|---|
| Flow | 100 MMSCFD | |
| $H_2$ | 38.0 | mole % |
| CO | 54.3 | mole % |
| $CO_2$ | 2.0 | mole % |
| $CH_4, C_2^+$ | 5.0 | mole % |
| Other ($N_2$, Ar) | 0.6 | mole % |
| $O_2$ | 0.1 | mole % |
| | 100.0 | mole % |
| $H_2/CO =$ | 0.7 | mole/mole |

Feed Pretreatment:
Hydrogenation of $O_2$ and olefins.
$H_2/CO$ inlet the FT reactor = 0.7 mole/mole.

Without FT Tail Gas Recycle

FT Synthesis Liquid Products:

| | | |
|---|---|---|
| Naphtha | $C_5$-$C_9$ | 200 BPD |
| Diesel | $C_{10}$-$C_{19}$ | 280 BPD |
| Soft Wax | $C_{20}$-$C_{34}$ | 510 BPD |
| Hard Wax | $C_{35}^+$ | 2,003 BPD |
| Total C5+ | | 2,993 BPD |
| Oxygenates | | 103 BPD |
| Water | | 1,193 BPD |

FT Tail Gas Purge:

| | | |
|---|---|---|
| $H_2$ | 3.29 MMSCFD | 7.99 mole % |
| CO | 13.58 MMSCFD | 32.99 mole % |
| $CO_2$ | 17.88 MMSCFD | 43.44 mole % |
| $N_2$ | 0.60 MMSCFD | 1.46 mole % |
| $CH_4$ | 5.32 MMSCFD | 12.93 mole % |
| $C_2H_4$ | 0.16 MMSCFD | 0.39 mole % |
| $C_2H_6$ | 0.06 MMSCFD | 0.15 mole % |
| $C_3H_6$ | 0.11 MMSCFD | 0.27 mole % |
| $C_3H_8$ | 0.05 MMSCFD | 0.12 mole % |
| $C_4H_8$ | 0.07 MMSCFD | 0.17 mole % |
| $C_4H_{10}$ | 0.04 MMSCFD | 0.10 mole % |
| Total | 41.16 MMSCFD | 100.00 mole % |

FIGURE 4

Acetylene Plant with Acetylene Offgas-to-Fischer Tropsch Synthesis
Examples based on Rentech's FT Technology

Example 5:

Without FT Tail Gas Recycle

| AOG Feed to FT Unit: | | | FT Synthesis Liquid Products: | | | FT Tail Gas Purge: | | |
|---|---|---|---|---|---|---|---|---|
| Flow | 100 | MMSCFD | Naphtha | $C_5$-$C_9$ | 279 BPD | $H_2$ | 46.20 MMSCFD | 68.29 mole % |
| $H_2$ | 65.9 | mole % | Diesel | $C_{10}$-$C_{19}$ | 327 BPD | CO | 3.96 MMSCFD | 5.85 mole % |
| CO | 26.4 | mole % | Soft Wax | $C_{20}$-$C_{34}$ | 407 BPD | $CO_2$ | 10.75 MMSCFD | 15.89 mole % |
| $CO_2$ | 2.0 | mole % | Hard Wax | $C_{35}$+ | 507 BPD | $N_2$ | 0.60 MMSCFD | 0.89 mole % |
| $CH_4$, $C_2$+ | 5.0 | mole % | Total C5+ | | 1,520 BPD | $CH_4$ | 5.45 MMSCFD | 8.06 mole % |
| Other ($N_2$, Ar) | 0.6 | mole % | | | | $C_2H_4$ | 0.23 MMSCFD | 0.34 mole % |
| $O_2$ | 0.1 | mole % | Oxygenates | | 57 BPD | $C_2H_6$ | 0.09 MMSCFD | 0.13 mole % |
| | 100.0 | mole % | Water | | 670 BPD | $C_3H_6$ | 0.15 MMSCFD | 0.22 mole % |
| $H_2$/CO = | 2.5 | mole/mole | | | | $C_3H_8$ | 0.07 MMSCFD | 0.10 mole % |
| | | | | | | $C_4H_8$ | 0.10 MMSCFD | 0.15 mole % |
| | | | | | | $C_4H_{10}$ | 0.05 MMSCFD | 0.07 mole % |
| | | | | | | Total | 67.65 MMSCFD | 100.00 mole % |

Feed Pretreatment:
Hydrogenation of $O_2$ and olefins.
$H_2$/CO inlet the FT reactor = 2.5 mole/mole.

Example 6:

Without FT Tail Gas Recycle

| Steel Mill Off Gas Feed to FT Unit: | | | FT Synthesis Liquid Products: | | | FT Tail Gas Purge: | | |
|---|---|---|---|---|---|---|---|---|
| Flow | 100 | MMSCFD | Naphtha | $C_5$-$C_9$ | 220 BPD | $H_2$ | 19.96 MMSCFD | 34.65 mole % |
| $H_2$ | 2.0 | mole % | Diesel | $C_{10}$-$C_{19}$ | 274 BPD | CO | 5.57 MMSCFD | 9.67 mole % |
| CO | 65.0 | mole % | Soft Wax | $C_{20}$-$C_{34}$ | 388 BPD | $CO_2$ | 13.18 MMSCFD | 22.88 mole % |
| $CO_2$ | 15.0 | mole % | Hard Wax | $C_{35}$+ | 670 BPD | $N_2$ | 18.00 MMSCFD | 31.24 mole % |
| $CH_4$, $C_2$+ | 0.0 | mole % | Total C5+ | | 1,552 BPD | $CH_4$ | 0.36 MMSCFD | 0.62 mole % |
| Other ($N_2$, Ar) | 18.0 | mole % | | | | $C_2H_4$ | 0.18 MMSCFD | 0.31 mole % |
| $O_2$ | 0.0 | mole % | Oxygenates | | 57 BPD | $C_2H_6$ | 0.07 MMSCFD | 0.12 mole % |
| | 100.0 | mole % | Water | | 697 BPD | $C_3H_6$ | 0.12 MMSCFD | 0.21 mole % |
| $H_2$/CO = | 0.0 | mole/mole | | | | $C_3H_8$ | 0.05 MMSCFD | 0.09 mole % |
| | | | | | | $C_4H_8$ | 0.08 MMSCFD | 0.14 mole % |
| | | | | | | $C_4H_{10}$ | 0.04 MMSCFD | 0.07 mole % |
| | | | | | | Total | 57.61 MMSCFD | 100.00 mole % |

Feed Pretreatment:
Shifting of CO to $H_2$ yielding $H_2$/CO = 1.4 inlet the FT reactor.
$CO_2$ removal to 5% inlet the FT reactor.

FIGURE 5

FISCHER-TROPSCH SYNTHESIS USING INDUSTRIAL PROCESS OFF GAS FEEDSTREAMS

CROSS REFERENCE PATENTS

This application claims priority from my provisional patent application, U.S. Ser. No. 60/223,680, filed Aug. 8, 2000.

FIELD OF INVENTION

The present invention relates to a process for synthesizing hydrocarbons from industrial waste gas streams such as acetylene off-gases.

BACKGROUND OF THE INVENTION

Fischer-Tropsch (FT) synthesis of hydrocarbons has been used as a commercial process since the 1950's. In a variety of guises, it is used to convert $H_2$ and CO gas to hydrocarbons. Typically the products from FT synthesis are standard temperature and pressure (STP) liquids. Gases and waxes are also produced. The history of FT synthesis is elucidated in the following works:

"State of the Art in GTL Technology, Report issued by Joe Verghese, Vice President Technology Oil and Gas, ABB Lumus Global, 1998;

Fischer-Tropsch Technology, report issued by the investment firm Howard, Weil, Labouisse, Friedrichs of New Orleans, author Arthur W. Tower II, Dec. 18, 1998;

Fischer-Tropsch Synthesis in the Liquid Phase, Kolbel et. al, Catal. Rev. Sci. Eng. 21(2), 225–274 (1980);

Fischer-Tropsch synthesis in the slurry phase, Schlesinger, M. D. et al., Industrial and Engineering Chemistry, 43(6) 1951 pp. 1474–79.

These works and the references contained therein are incorporated by reference in their entirety herein.

Fischer-Tropsch (FT) synthesis converts hydrogen and carbon monoxide into a wide boiling-point range of hydrocarbons. The hydrogen and carbon monoxide (synthesis gas) can be produced from a variety of carbon-bearing feedstocks and the resulting high-quality crude oil can be further processed to specific boiling-point fractions. Of special interest is the diesel fuel fraction because it requires little processing from the FT crude oil and it has desirable characteristics including very low sulfur and aromatic content, high cetane index, and it burns exceptionally cleanly in a compression-ignition engine.

FT technology was invented in Germany in the 1920's and supplied that country with its liquid fuels during World War II. Since that time, interest in the technology has come and gone, generally in phase with increases in the cost of crude oil or supply restrictions. Two of the first plants in the U.S. were the Carthage Hydrocol Plant in Brownsville, Tex. in the late 1940's (See Keith "Gasoline from Natural Gas," Oil and Gas Journal, Jun. 15, 1946, pp. 104–111) and the U.S. Bureau of Mines plant in Louisiana, Tex. in the early 1950's (See Linz, "Synthesis Test," Oil and Gas Journal, Aug. 31, 1950, pp. 42–43, and Kastens, et al., "An American Fischer-Tropsh Plant," Ind. & Engr. Chem., March 1952, pp. 450–466).

A recent peak in FT interest appears to have been stimulated by several factors including environmental issues and the resulting interest in clean-burning liquid fuels, a desire for fuels derived from secure domestic feedstocks, interest in exploiting stranded or associated gas resources and heavy oil residues, among others. The 1998 investor research report by Howard, Weil, Labouisse, Friedrich of New Orleans covers the history and background of FT as well as current efforts in the field.

Generally, conventional FT synthesis employs a hydrocarbon feed stock having an undesirable characteristic to make synthesis gas containing CO and $H_2$ which is then passed over a Fischer-Tropsch catalyst which forms hydrocarbons with more desirable characteristics. Thus, for example, coal, which is unsuitable in its mined state for use as a motor fuel, can be converted into synthesis gas by oxidizing it under controlled conditions in the presence of water. This produces synthesis gas (primarily CO and $H_2$), which is then used to produce hydrocarbons which are liquids under STP conditions and thus may readily be employed as motor fuel. In this manner the coal with its undesirable physical characteristics is converted into gasoline, kerosene, and diesel fuel, hydrocarbons having more desirable characteristics for engine fuels than the coal from which they were synthesized. But Fischer-Tropsch synthesis can normally only be carried out with feed streams that are carefully optimized for the process. Also, conversion of a hydrocarbon feedstock to synthesis gas and back to hydrocarbons does not have the thermal efficiency required to make it economically viable unless the FT catalysts have high carbon conversion ratios. Additional inefficiencies are inherent in the energy waste of synthesis gas production.

The present invention notes that there are certain industrial processes which produce off gases that are particularly suited to conversion to liquid hydrocarbons, using processes specified in U.S. Pat. Nos. 5,763,716, 5,645,613, 5,543,437, 5,506,272, and 5,324,335, all of which are incorporated by reference in their entirety herein. All these patents are assigned to Rentech, Inc., as is the present application.

A major portion of a typical FT synthesis plant is dedicated to the necessary conversion of hydrocarbon feedstocks to "synthesis gas" upon which the FT catalyst may operate. In this first step, the feedstock is then converted to a mixture of hydrogen and CO. This often requires extensive treatment to adjust the synthesis gas stream to a composition compatible with the requirements of the catalyst and operating conditions employed. This step may be eliminated by employing the waste gas streams from industrial processes which have compositions amenable to Fischer-Tropsch reactions. Such a scheme provides for improved efficiency in feedstock utilization since it eliminates the synthesis gas production step and adds value to a gas stream which would otherwise be discarded as a waste byproduct of the particular process being carried out. Typically, the apparatus for synthesis gas preparation amounts to about two thirds of the cost of a Fischer-Tropsch plant. Utilization of waste gas streams often requires some pre-Fischer Tropsch reactor processing to render the waste gas usable in FT synthesis, but at a fraction of the cost of the synthesis gas preparation section of a typical FT plant.

The FT synthesis scheme of the present invention utilizes FT technology which can accept a wide range of variable conditions such as are disclosed in the above patents and U.S. Pat. Nos. 5,621,155 and 5,620,670, which are totally incorporated by reference herein.

This FT synthesis technology can be used in conjunction with waste gas streams produced in the production of acetylene by quenching a partially oxidized natural gas stream, such as that described in U.S. Pat. No. 5,824,834, which along with the references contained therein is totally incorporated by reference herein. Applicants are presently unaware of any planned or operating units subjecting AOG or related tail gases to FT reactions producing hydrocarbons.

SUMMARY OF THE INVENTION

One aspect of the present invention is the utilization of industrial waste gas streams containing hydrogen and CO by converting what amounts to a crude synthesis gas to valuable liquid hydrocarbons.

A specific aspect of the present invention is a process for employing the waste gas of an acetylene plant to produce liquid hydrocarbon stocks which can be employed as motor fuels, thus adding value.

Another aspect of the present invention is a process for optimizing carbon utilization of the carbon content of a acetylene production plant waste gas stream in the production of commercially useful hydrocarbons, including chemical feedstocks and waxes.

Yet another aspect of the present invention is to efficiently and cost-effectively utilize the waste gas stream of an acetylene production plant in Fischer-Tropsch synthesis.

In accordance with the present invention, a process for converting industrial waste gases to liquid hydrocarbons is provided, comprising steps of:

a) collecting waste gases comprising hydrogen and CO;
b) optionally, compressing or expanding the collected waste gases to a pressure suitable for Fischer-Tropsch reactions;
c) pretreating the waste gases to produce a feed gas composition and proportions suitable for Fischer-Tropsch reactions;
d) passing the compressed feed gases through at least one Fischer-Tropsch synthesis reactor containing a FT catalyst under reaction conditions suitable for the production of hydrocarbons; and
e) collecting hydrocarbons from the products formed.

In the processes of the invention, the pretreatment of the waste gases can be employed to adjust the molar hydrogen/CO ratio in the feed gases provided to the FT reactor, and/or to remove at least a portion of at least one of the gases oxygen, acetylene, olefins and sulfurous gases. The feed gas should comprise a maximum of 20 mole percent carbon dioxide, and the molar hydrogen/CO ratio can range from about 0.5 to about 3.5.

A particularly suitable industrial waste gas is an acetylene off-gas, comprising from about 40 to about 80 mole percent hydrogen and from about 15 to about 50 mole percent CO. The molar hydrogen/CO ratio of the gas is preferably from about 0.7 to about 3.

The pressure of the feed gas can be at least 200 psia, preferably from about 200 to about 450 or 500 psia, and most preferably from about 250 to about 400 psia. With iron-based catalysts, a preferred range is from about 300 to about 400 psia.

The catalyst used in the FT reactor can be based upon cobalt, ruthenium or iron, or combinations thereof, but is preferably an iron-based catalyst. When using an iron-based catalyst, the molar hydrogen/CO ratio of the FT reactor feed can be in the range of from about 0.6 to about 3.5, preferably from about 1.2 to about 1.8, while catalysts using cobalt or ruthenium permit a range of from about 1.8 to about 2.2.

When multiple FT reactors are used, they can be connected in series and/or parallel to suit the available feed gases and catalysts; with cobalt catalysts, series reactors may serve to increase carbon conversion.

As part of pretreatment, the compressed or expanded waste gases can be hydrogenated or hydrotreated before entering the FT reactor. The gases can also be subjected to conventional water-gas shift reactions to adjust the molar $H_2/CO$ ratio. The FT reactor tail gases can be utilized in several ways to improve efficiency, including recycling at least a portion to the FT reactor, preferably via a compression step; separating hydrogen for feed in hydrogenation and product upgrading steps such as hydrotreating, hydrocracking, olefin saturation and pre-reforming.

Other aspects, objects and advantages of the present invention will become apparent upon review of the following detailed description, the appended claims and the drawings.

BRIEF DESCRIPTION OF THE DRAWINGS

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation. The present invention is defined and limited only by the appended claims.

FIG. 4: Two Further Calculated Examples of the Production of Hydrocarbons From Acetylene Off Gas Streams Under a Variety of Conditions, Without Tail Gas Recycle.

FIG. 5: One Additional Calculated Example of the Production of Hydrocarbons From Acetylene Off Gas Streams, Without Tail Gas Recycle, and One Calculated Example of Production of Hydrocarbons from a Steel Mill Off-Gas Stream, Without Tail Gas Recycle.

DETAILED DESCRIPTION OF PREFERRED EMBODIMENTS

Although the present invention will be discussed in terms of converting off-gases from acetylene production plants to liquid hydrocarbons, it can be applied to any industrial waste gas containing reasonable amounts of $H_2$ and CO (e.g., at least twenty mole percent combined $H_2$ and CO) and a wide $H_2/CO$ range (e.g., in principle a hydrogen/CO ratio in the range of from about essentially zero to nearly infinity). Such gases may need to be compressed, heated or otherwise processed to optimize their properties for reaction in the FT reactor. Proportions of gaseous ingredients will normally be expressed in mole percentages. The term "and/or" may be used in the conventional sense, i.e. "A and/or B" meaning that either A or B may be present alone, or they may both be present.

Figure 1:
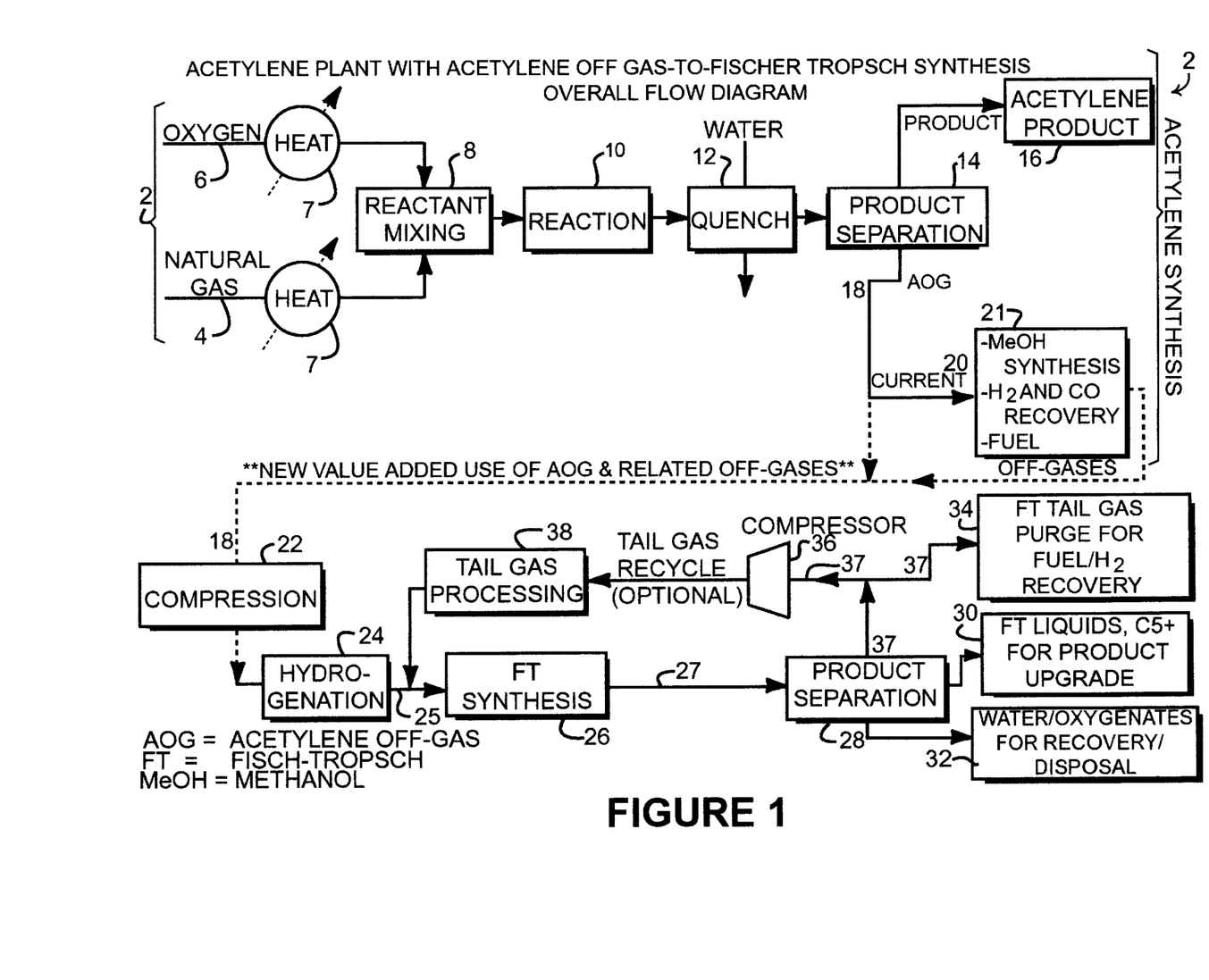
FIG. 1: A schematic diagram of an acetylene production plant coupled to a Fischer-Tropsch processing loop for utilization of the acetylene production waste gas stream.

With reference to FIG. 1, the production of acetylene, as disclosed in U.S. Pat. No. 5,824,834, which is incorporated herewith in its entirety, is shown as the upper process schematic, bracketed and labeled "acetylene synthesis" (2). As discussed in detail in that patent and well known in the art, such processes apply partial oxidation of hydrocarbons such as natural gas (4) with oxygen (6) in a reactor 10, after preheat (7) and mixing (8), then quench the combustion products (12) and separate (14) an acetylene product 16.

The present invention takes the waste gas 18 directly from the production of acetylene, shown as an arrow labeled "AOG" emerging from the upper schematic box 14 labeled "Product Separation". Currently this gas is typically diverted to the production of methanol (21), or else it is stripped of $H_2$ and CO for other uses or burned as fuel. These uses can be characterized as being of relatively low value. In the present invention, this stream can be compressed or otherwise treated to bring the pressure of the waste gas stream to at least about 250 psig, preferably from about 250 to about 400 psia, then introduced to a Fischer-Tropsch reaction scheme such as is specified in any one of U.S. Pat. Nos. 5,324,335, 5,620,670, 5,763,716, and 6,068,760, which are all totally incorporated by reference herein.

A simple hydrogenation unit may be required to remove trace compounds from the AOG, such as unsaturated hydrocarbons and residual oxygen. The FT liquid hydrocarbons which can be produced are of much higher value than the methanol and other byproducts currently obtained.

The reactor can be a conventional fixed bed reactor as described in many of the publications cited above, and in Dry, "The Fischer-Tropsch Synthesis," Chapt. 4 in *Catalyst Science Technology*, Anderson & Bowland, eds., Vol. 1, Springer-Verlag, [CITY] (1985). The reactor is preferably a slurry reactor as disclosed in Rentech's U.S. Pat. No. 5,620,670, incorporated herein by reference. The catalyst can be a cobalt or ruthenium-based catalyst as described in the Rentech patents cited above, and disclosed in Exxon's U.S. Pat. No. 5,348,982. Preferably, the catalyst is an iron-based catalyst as disclosed in the above Rentech patents, particularly U.S. Pat. No. 5,504,118, and is prepared as described in the latter patent, which is incorporated herein by reference. These catalysts are preferably copperpotassium promoted iron catalysts of precipitated form. Iron-based catalysts in general, and the Rentech versions of U.S. Pat. No. 5,504,118 in particular, will accommodate broader ranges of molar hydrogen/CO ratios in the feed gas entering the FT reactor, i.e., from about 0.6 to about 3.5. Cobalt-based catalysts typically require ratios in the range of from about 1.8 to about 2.2, and are limited by availability and price. Ruthenium-based catalysts may accommodate feed ratios in the range of from about 1.8 to about 2.2. The pressure of the feed gas entering the FT reactor should be in the range of from about 250 to about 400 psia, and the space velocity within the reactor can range from about 1.5 to about 4 $Nl(H_2+CO)/hr/gram$ catalyst. The reactor temperature can range from about 240 to about 270 deg. C. The catalyst particles can range in diameter from about 1 to about 100 microns, and the catalyst concentration (in the slurry) can be in the range of from about five to about forty weight percent.

The three methods of the '118 patent (which is incorporated herein by reference) summarized by the '118 claims as:

1. In a method for preparing a catalytically active Fischer Tropsch promoted iron catalyst, which method comprises activating an inactive catalyst precursor comprising iron oxide and a promoting amount of potassium and copper, said iron oxide being selected from the group consisting of hydrous iron oxides, and precipitated iron oxide comprised predominantly of hematite, said activation being effected by contact of said inactive catalyst precursor with a mixture of gaseous hydrogen and carbon monoxide, at elevated temperature and pressure, the improvement which comprises:
    activating said catalyst precursor by conducting said contacting at a temperature of about 250 degrees C. to 300 degrees C. for about 0.5 to 5 hours, with a water vapor partial pressure of about 1 psig. and a hydrogen to carbon monoxide ratio of about 1.3 to 1.5, said activation beting effective to increase the selectivity of the activated catalyst in the subsequent formation of liquid hydrocarbons in a Fischer Tropsch reaction.

2. A method of making a promoted iron catalyst useful in a slurry fisher-Tropsch reactor comprising the steps of:
    dissolving at less than 150 degrees C. predetermined quantities of copper and iron in nitric acid to form a solution of ferrous nitrate, ferric nitrate and cupric nitrate:
        sparging the solution with oxygen-containing gas during the step of: dissolving;
        precipitating a catalyst precursor by the addition of sufficient ammonium hydroxide to the solution formed;
        removing the ammonium nitrate formed during the precipitation step;
        washing the catalyst precursor;
        adding by mixing a water slurry containing potassium carbonate to the catalyst precursor in an amount sufficient to promote the catalyst;
        drying the mixed catalyst precursor and potassium carbonate promoter and sizing to a particle size of from about: 5 to about 50 microns;
        heating the solids obtained in air to a temperature of about 600 degrees F. for a sufficient time to drive off residual moisture to render it suitable for activation and subsequent use in a Fischer Tropsch slurry reaction.

3. A method of making a promoted iron catalyst useful in a slurry Fischer-Tropsch reactor comprising the steps of:
    dissolving at less than 150 degrees C. predetermined quantities of copper and iron in nitric acid to form a solution of ferrous nitrate, ferric nitrate and cupric nitrate;
        sparging the solution with oxygen-containing gas during the step of dissolving;
        precipitating a catalyst precursor by the addition of sufficient ammonium hydroxide to the solution formed;
        removing the ammonium nitrate formed during the precipitation step;
        washing the catalyst precursor;
        adding by mixing a water slurry containing potassium carbonate to the catalyst precursor in an amount sufficient to promote the catalyst;
        drying the mixed catalyst precursor and potassium carbonate promoter and sizing to a particle size of from about 5 to about 50 microns;
        heating the solids obtained in air to a temperature of about 600 degrees F. for a sufficient time to drive off residual moisture; and
        activating said catalyst by contacting said catalyst with a mixture of gaseous hydrogen and carbon monoxide at a temperature of about 250 degrees C. to 300 degrees C. for about 0.5 to 5 hours, with a water vapor partial pressure of about 1 psig, and a hydrogen to carbon monoxide ratio of about 1.3 to 1.5, said activation being effective to increase the selectivity of the activated catalyst in the subsequent formation of liquid hydrocarbons in a Fischer Tropsch reaction.

The AOG 18, which can include off-gases from a methanol synthesis step 21, can be compressed (22) and/or hydrogenated (24) as necessary to optimize the synthesis gas characteristics for FT reactions. Section 24 can be employed for additional pretreatments as necessary. For example, waste gases with low $H_2/CO$ ratios can be adjusted to a $H_2/CO$ ratio compatible with the FT synthesis feed requirements by means of waste gas shift pretreatment.

Waste gases with high $H_2/CO$ ratios can be adjusted to a $H_2/CO$ ratio compatible with the FT synthesis feed requirements by means of waste gas back-shift pretreatment, as long as the waste gas contains sufficient $CO_2$ or $CO_2$ can be added as needed. Alternatively hydrogen may be removed selectively to lower the $H_2/CO$ ratio by means of membrane or PSA (Pressure Swing Absorption) technology. The resulting processed gases 25 then enter the FT reactor 26, where products including liquid hydrocarbons are synthesized. Exothermic heat of reaction from the FT unit generates steam (not shown), which can be sent to a steam turbine if a combined cycle power plant is employed. FT overhead product is also cooled (not shown).

The FT reactor is preferably a slurry reactor. In a slurry reactor, finely divided catalyst particles are suspended in a liquid hydrocarbon wax medium. Synthesis gas is introduced into the bottom of the reactor and bubbles up through the wax/catalyst slurry. Temperature control for the exothermic reaction is provided by cooling tubes suspended in the slurry and the resulting heat removed is usually used to generate steam for process or power requirements.

The slurry reactor is attractive, especially for small plants, because of its low cost and excellent temperature control, catalyst inventory and catalyst consumption (See e.g., Riekert, et al., "Comparison of Fischer-Tropsch Reactors," Chemical Engineering Progress, April, 1982, pp. 86–90). See also Dry, supra. Hydrodynamics plays a critical role in a slurry reactor via bubble diameter, catalyst distribution, and mass transfer (See Inga et al., "Hydrodynamic and Mass Transfer Characteristics in a Large-scale Slurry Bubble Column Reactor," presented at $15^{th}$ Annual International Coal Conference, Pittsburgh, Pa., September 1998). Therefore, the design of the synthesis gas distributor, reactor internals, and the reactor operating parameters are critical to successful operation. Typically, empirical correlations have been used to estimate these design parameters although recently there have been successful attempts to predict gas holdup and backmixing by numerical methods.

Various FT catalysts containing at least one (i.e., combinations) of the metals iron, cobalt and ruthenium can be used in the reactor, and suitable catalysts from this field can be selected by those skilled in the art according to the composition and expected properties of the feedstockts). Some of these catalysts are disclosed in the U.S. Patents cited above. Since the feedstock can contain industrial waste gases (such as AOG) and optionally related recycled tail gases, the composition and hydrogen/CO ratios can vary significantly. FT tail gas recycling steps and other measures can moderate some of these variations and control the hydrogen/CO ratio at the FT reactor inlet to a relatively narrow range to permit the use of a variety of existing FT catalysts. However, the iron-based FT catalysts described above are particularly suitable for a variety of industrial waste gas feedstocks, including AOG, because they will accommodate relatively wide ranges of hydrogen/CO ratios while maintaining relatively high carbon conversion ratios.

Iron-based FT catalysts are preferred for a number of reasons including cost, availability, disposability/toxicity, and the ability to work with a wide range of synthesis gas hydrogen to carbon monoxide ratios. Because of this last advantage of iron-based FT catalysts, a wide range of feedstocks can be considered for partial oxidation and subsequent FT synthesis, including natural gas or other light hydrocarbon gases, liquids including Orimulsion™ (an aqueous bitumen emulsion), naphtha, heavy oil, asphalt, refinery bottoms, and solids including coal, bitumen, petroleum coke and biomass. Similarly, in the present invention, such catalysts will accomodate a variety of industrial off-gasses which are suitable for FT conversion or can easily be made so.

The FT products thus obtained are
- Liquid hydrocarbons with five or more carbon atoms, which may be fractionated into salable naphtha, diesel and wax fractions. These products can be used for low sulfur clean fuels (e.g., diesel), or for chemical feedstocks, formulation of lubricants, drilling fluids, etc. These are all considered high value products.
- Water fraction containing oxygenates, from which saleable alcohols and organic acids may be recovered.
- Tail-gas, which after proper processing (e.g., steam methane reforming, carbon dioxide removal and recycle), may be recycled for additional FT product synthesis, and/or used for recovering the contained hydrogen and as fuel.

Following the FT synthesis step, the products 27 are then separated (28) by fractional distillation or by any one of a number of processes such as are well known to those practiced in the art. The FT product stream is typically separated into five streams in the hydrocarbon recovery unit(28): water/oxygenates 32, hydrocarbons 30, including naphtha ($C_5$ to $C_9$), diesel ($C_{10}$ to $C_{19}$) and wax ($C_{70}+$) and overhead tail gas 37. The FT tail gas can be recycled, as shown at 36 and 38. The hydrocarbon fractions are collected as the primary products. In some applications, FT waxes may have little or no value. Thermal or hydrocracking can be used to convert the wax stream and thus increase the naphtha and diesel streams.

The preferred products are liquid hydrocarbons (30) having at least about five carbon atoms, preferably from about five to about 20 carbon atoms. These liquid hydrocarbons are valuable because of their suitability for motor fuel, including diesel fuel. Such FT fuel products are expected to be in high demand due to new environmental regulations for clean fuels. The waxy fraction ($C_{20}+$) can be converted to a variety of waxes and oils, and other components can produce a variety of useful chemicals and intermediates. Water and oxygenates are separated at 32 for recovery or disposal.

After the FT products are separated, the "tail gas" 37 remaining may be reintroduced into the process (discussed below) or it may be processed (34) to recover hydrogen and the remaining components burned as fuel in steam or electrical power generation. The tail gas 37 can be recycled to the FT reactor 26 via compressor 36 and further processing 38 including steam reforming. This will help to increase the conversion ratio of carbon in the synthesis gas which is converted to liquid hydrocarbons.

Figure 3:
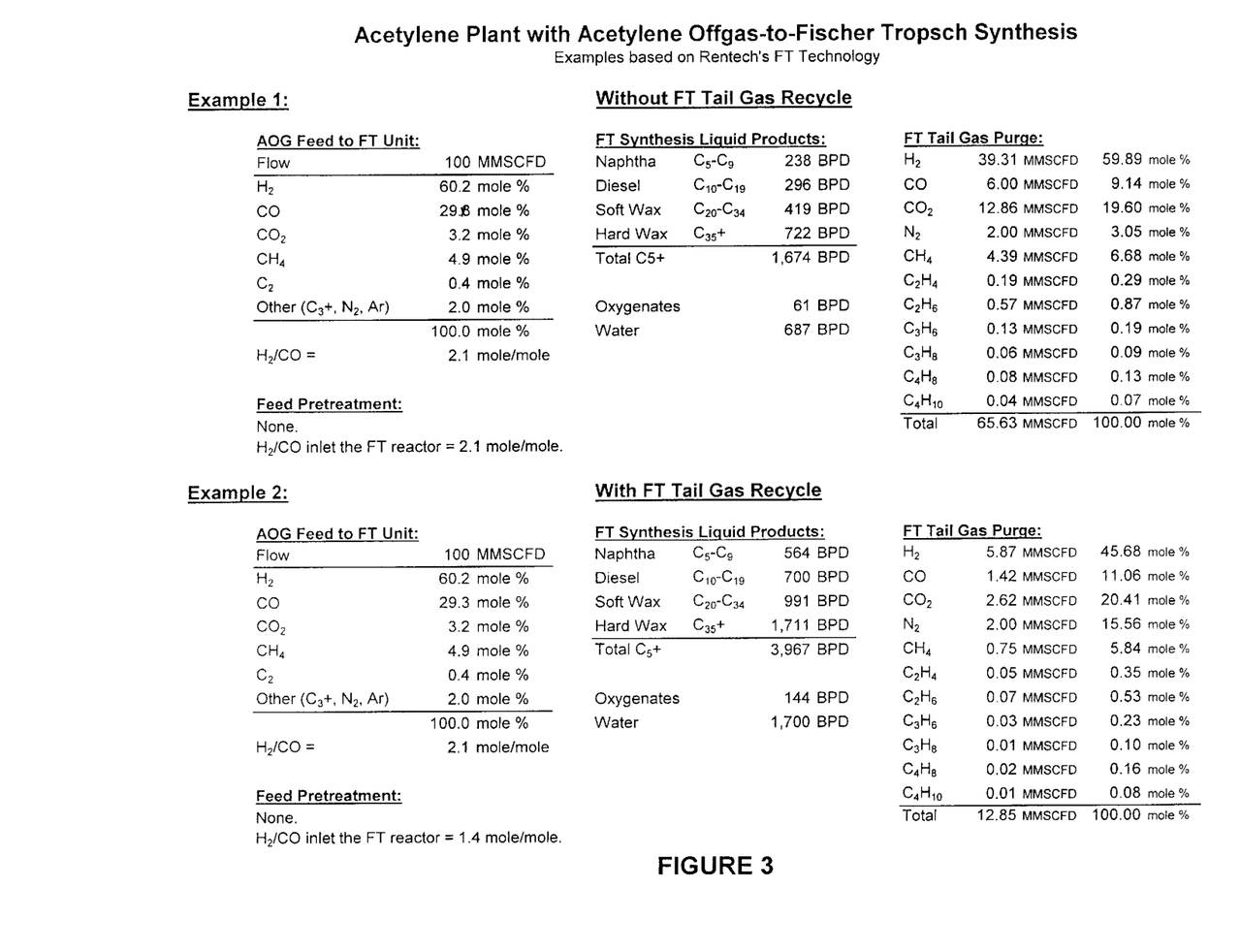
FIG. 3: Two Examples of the Production of Hydrocarbons From Typical Acetylene Off Gas Streams With and Without Tail Gas Recycle.

With reference to FIG. 3, examples 1 and 2 show results from typical Acetylene Off Gas (AOG) streams when subjected to a Fischer-Tropsch reaction scheme under the conditions such as are described in any one of the above cited patents, both with and without the optional step of tail gas recycling (described above). These results show that it is economical to produce hydrocarbons with increased commercial value over methanol, Hydrogen and/or carbon monoxide, or steam now being produced with the AOG off gas. The results show that a high percentage of the carbon content of the feedstream is incorporated into the products of the Fischer-Tropsch reactor.

Additional efficiencies are realized if the tail gas recycle loop shown in FIG. 1 is used. In the lower (FT) processing stream, the tail gas 37 from the Product Separation section 28, can optionally be used as a "Tail Gas Recycle" loop. The tail gas recycle loop for tail gas 37 begins at the product separation process 28, passing the components of the "tail gas" through a compression stage 36 and returning to the feed stream for the FT synthesis stage 26 through a processing stage 38 labeled "Tail Gas Processing", for steam reforming.

Figure 2:
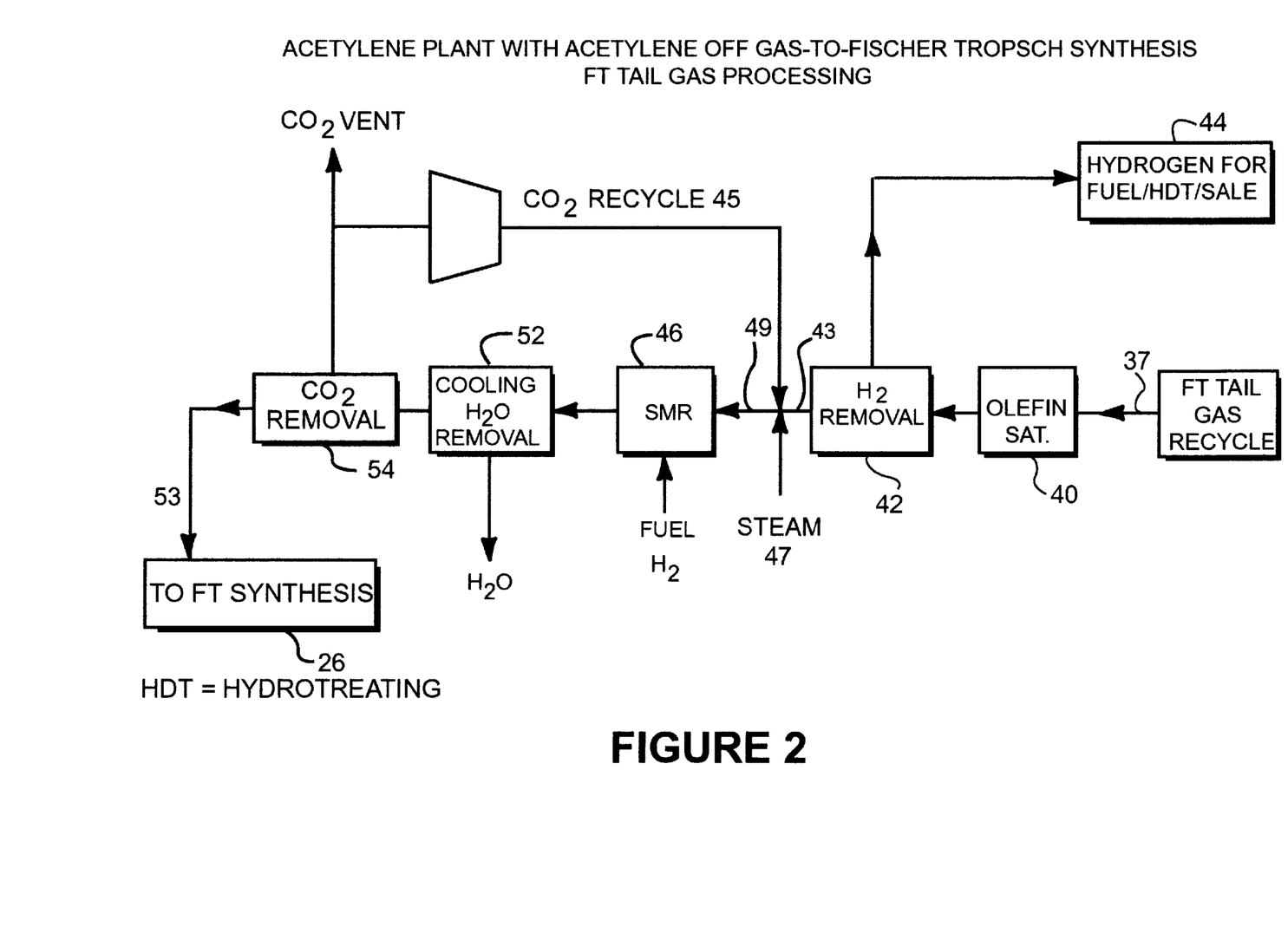
FIG. 2: A schematic diagram elucidating the steps involved in the "Tail Gas Recycling" loop specified in the Fischer-Tropsch processing loop of FIG. 1.

Tail Gas Processing is further elucidated with reference to FIG. 2 and U.S. Pat. Nos. 5,621,155 and 5,620,670, which are incorporated herein by reference. This consists of a series of steps in which the unsaturated hydrocarbons contained in the FT tail gas 37 are first subjected to hydrogenation (at the processing stage 40 labeled "Olefin Saturation"). Excess hydrogen emerging from this process may then be stripped off (42) and reused in the hydrotreating (HDT) 44 of the Fischer-Tropsch liquid hydrocarbon products, or as fuel in the steam reformer 46 (SMR). Hydrotreating, both in this process and in the alternative "hydrogenation" step 24 shown at the beginning of the FT processing loop of FIG. 1 is well known to those skilled in the art. The catalysts employed for hydrogenation, both in the recycle loop and as a optional first step treatment of AOG streams may be typical hydrogenation catalysts containing metals such as Cu, Ni or Pd, such as, for example, Haldor Topsoe's ST-101™ or Synetix's Puraspecm, SudChemie's C31-7 and T-2047, or BASF's R0-20 and R3-15, under conditions which are well known to those practiced in the art.

Following hydrogenation, the gas stream 43 is then mixed with recycled $CO_2$ 45 and steam 47, and then the treated gases 49 subjected to steam reforming 46. Steam reforming is well known in the art, and is elucidated in the book "Catalytic Steam Reforming" by J. R. Rostrup-Nielsen (Haldor Topsoe A/S), Springer-Verlag Berlin Heidelberg New York Tokyo 1984. This work is incorporated by reference herein. See U.S. Pat. No. 3,531,263, which is incorporated herein by reference. The reformed hydrocarbon stream 51 from the reformer 46 is then cooled (52) and the excess $CO_2$ and water are removed (52, 54) under conditions which are well known to those practiced in the art and specified in the above referenced patents. The purified stream 53 of synthesis gas, thus prepared, is then directed back into the FT synthesis reactor as described above.

Reference to FIG. 3 shows the additional carbon (listed as all of the carbon containing species in the "tail gas" below and including $CH_4$ as well as oxides of carbon) which may potentially be recovered using such a recycle loop. With particular reference to FIG. 3, example 2 in comparison to example 1 shows the additional liquid hydrocarbons which may be realized from the processing it scheme under identical conditions of processing and feed stream composition when tail gas recycle is employed, thus the production of materials incorporating five carbon atoms or more is increased more than two-fold when tail gas recycling is employed.

With further reference to FIG. 1, in the processing steps of the present invention (lower schematic), the Acetylene Off Gas (AOG) 18 is shown as passing through a hydrogenation step 24 prior to passing into the Fischer-Tropsch reactor 26 (shown as the "FT synthesis step"). This stage may be employed when the feed streams of industrial waste gas contain an excessive amount of unsaturated hydrocarbons and/or residual oxygen. This hydrogenation unit, as referenced above for the "tail gas recycle loop", may be any such method as is well known to those practiced in the art.

The use of the tail gas recycle loop and/or the hydrogenation step permits greater flexibility in feed stream composition that can be tolerated by the FT process. As such, utilizing these two optional processing steps permits the use of FT catalysts based on metals other than iron, such as are well known to those practiced in the art.

The ranges of waste gas feed stream compositions which work well with the present invention are listed as follows:

| Component | Mole Percent |
|---|---|
| Hydrogen | 40–80% |
| Carbon Monoxide | 15–50% |
| Carbon Dioxide | 0–20% |
| Methane | 0–20% |
| Hydrocarbons $C_2$–$C_5$ | 0–15% |
| $O_2$ | 0–0.5% |
| Other | 0–5% |

Samples of Industrial Offgases Suitable for FT Synthesis:

| | Example | | | | | | Example 8 Ranges for non $H_2$ and CO components | |
|---|---|---|---|---|---|---|---|---|
| Dry gas composition | 1/2 Mole % | 3 Mole % | 4 Mole % | 5 Mole % | 6 Mole % | 7 Mole % | Min Mole % | Max. Mole % |
| $H_2$ | 60.2 | 61.8 | 38 | 65.9 | 2 | 63 | | |
| CO | 29.3 | 30.5 | 54.3 | 26.4 | 65 | 32 | | |
| $CO_2$ | 3.2 | 2 | 2 | 2 | 15 | 3 | 0 | 25 |
| Methane, other hydrocarbons | 5.3 | 5 | 5 | 5 | 0 | 2 | 0 | 35 |
| $N_2$, Others | 2.0 | 0.6 | 0.6 | 0.6 | 18 | 0 | 0 | 50 |
| Oxygen | 0 | 0.1 | 0.1 | 0.1 | 0 | 0 | 0 | 2 |
| Sum = | 100 | 100 | 100 | 100 | 100 | 100 | 0 | |
| $H_2$/CO Ratios = | 2.1 | 2.0 | 0.7 | 2.5 | 0.03 | 2.0 | | |

Possible Pre-treatment Requirements Before FT Synthesis:

Example 3–5, 8: Hydrogenation of $O_2$ content may be required.

Example 6: Require adjustment of $H_2$/CO ratio prior to FT synthesis; may also require reduction in $CO_2$ content, depending upon FT catalyst system.

Example 8: Depending on $CO_2$ level and FT catalyst system may require reduction in $CO_2$ content.

Examples 1–5 are AOG-related streams, Ex. 3 having the same composition as Ex. 1 of U.S. Pat. No. 5,824,834 for acetylene production.

Example 6 is a typical industrial off-gas from a steel mill.

Example 7 is an industrial off-gas related stream.

Calculated examples are provided in FIGS. 3–5. These examples (3,4,5) illustrate the performance of the process over a wide range of molar $H_2$/CO ratios, and the versatility of the iron-based catalyst under such conditions. Example 6 illustrates the shifting adjustment of an off-gas with very low hydrogen content.

Clearly, numerous modifications and variations of the present invention are possible in light of the above teachings. It is therefore to be understood that within the scope of the appended claims the invention may be practiced in various ways other than as specifically described herein.

I claim:

1. A process for converting industrial waste gases from a steel mill to liquid hydrocarbons, comprising steps of:
   a) collecting waste gases from a steel mill, said waste gases comprising $H_2$ and CO;
   b) optionally, compressing or expanding the collected waste gases to a pressure suitable for Fischer-Tropsch reactions;
   c) pretreating said waste gases to produce a feed gas composition and proportions suitable for Fischer-Tropsch reactions;
   d) passing the compressed feed gases through at least one Fischer-Tropsch synthesis reactor containing a Fischer-Tropsch catalyst under reaction conditions suitable for the synthesis of hydrocarbons;
   e) collecting hydrocarbons from the products formed; and
   f) wherein the compressed or expanded gases are subjected to a hydrogenation step prior to entering said Fischer-Tropsch reactor.

2. The process of claim 1 wherein said pretreatment of said waste gases is employed to adjust the ratio of $H_2$ to CO in gases fed to the Fischer-Tropsch reactor.

3. The process of claim 1 wherein said pretreatment of said waste gases is employed to remove at least a portion of at least one gas selected from the group consisting of oxygen, acetylene, olefins and sulfurous gases.

4. The process of claim 1 wherein said FT reactor feed gas comprises a maximum of 20 percent carbon dioxide.

5. The process of claim 1 wherein the molar ratio of $H_2$ to CO in said feed gas is in the range of from about 0.6 to about 3.5.

6. The process of claim 1 wherein said industrial waste gas is an acetylene off-gas resulting from the production of acetylene.

7. The process of claim 6 wherein said acetylene off-gas comprises from about 40 to about 80 mole percent $H_2$ and from about 15 to about 50 mole percent CO.

8. The process of claim 7 wherein the ratio of $H_2$ to CO in said off-gas is in the range of from about 0.7 to about 3.

9. The process of claim 7 wherein the pressure of said feed gas is in the range of from about 200 to about 450 psia.

10. The process of claim 1 wherein said catalyst is an iron-based catalyst.

11. The process of claim 10 wherein said catalyst is a copper-potassium promoted, precipitated iron catalyst.

12. The process of claim 11 wherein said catalyst is prepared by a method comprising a step of activating an inactive catalyst precursor comprising iron oxide and a promoting amount of potassium and copper, said iron oxide being selected from the group consisting of hydrous iron oxides, and precipitated iron oxide comprised predominantly of hematite, said activation being effected by contact of said inactive catalyst precursor with a mixture of gaseous hydrogen and carbon monoxide, at elevated temperature and pressure, wherein said catalyst precursor is activated by conducting said contacting at a temperature of about 250° C. to 300° C. for about 0.5 to 5 hours, with a water vapor partial pressure of about 1 psig, and a hydrogen to carbon monoxide ratio of about 1.3 to 1.5, said activation being effective to increase the selectivity of the activated catalyst in the subsequent formation of liquid hydrocarbons in a FT reaction.

13. The process of claim 11 wherein the molar ratio of $H_2$ to CO in the feed gas is in the range of from about 0.6 to about 3.5.

14. The process of claim 1 wherein said catalyst is a cobalt-based catalyst.

15. The process of claim 14 wherein the molar ratio of $H_2$ to CO in the feed gas is in the range of from about 1.8 to about 2.2.

16. The process of claim 1 wherein said catalyst is a ruthenium-based catalyst.

17. The process of claim 16 wherein the molar ratio of $H_2$ to CO in the feed gas is in the range of from about 1.8 to about 2.2.

18. The process of claim 10 wherein the molar ratio of $H_2$ to CO in the feed gas is in the range of from about 1.2 to about 1.8.

19. The process of claim 10 wherein the pressure of the feed gas is in the range of from about 300 to about 400 psia.

20. The process of claim 1 wherein said hydrocarbons collected comprise molecules containing in the range of from about 5 to about 200 carbon atoms.

21. The process of claim 20 wherein said hydrocarbons collected include species classified as naphthas, middle distillates and waxes.

22. The process of claim 1 wherein a plurality of said FT reactors are connected in series and/or parallel.

23. The process of claim 1 wherein at least a portion of tail gas from said Fischer-Tropsch reactor is recycled to said reactor after separation of hydrocarbons.

24. The process of claim 23 wherein hydrogen is separated from the tail gas of said Fischer-Tropsch reactor and employed in the hydrogenation step and/or product upgrading.

25. The process of claim 1 wherein the catalyst of said Fischer-Tropsch reactor is contained in a slurry.

26. The process of claim 1 wherein the $H_2$/CO ratio is adjusted by either water-gas shifting or back-shifting the gas prior to entering said Fischer-Tropsch reactor.

27. The process of claim 10 wherein at least a portion of tail gas from said Fischer-Tropsch reactor is recycled to said reactor after separation of hydrocarbons.

28. The process of claim 14 wherein at least a portion of tail gas from said Fischer-Tropsch reactor is recycled to said reactor after separation of hydrocarbons.

29. In a process for the production of liquid carbonaceous materials the steps comprising:
   a) collecting the waste gas from an acetylene synthesis plant,
   b) compressing the gas to a suitable pressure for Fischer-Tropsch reactions,
   c) passing the compressed gas through at least one Fischer-Tropsch catalytic reactor, and
   d) collecting the liquid hydrocarbon products formed therefrom.

30. The process of claim 29 wherein the catalyst of said Fischer-Tropsch reactor comprises an iron-based catalyst.

31. The process of claim 30 wherein said waste gas comprises $H_2$ and CO in a molar ratio in the range of from about 0.5 to about 3.5.

32. The process of claim 29 wherein said liquid hydrocarbon products comprise species classified as naphthas, middle distillates or waxes.

33. The process of claim 29 wherein said waste gas is compressed to a pressure of at least about 200 psia before entering said reactor.

34. The process of claim 29 wherein a plurality of Fischer-Tropsch reactors are connected in series and/or parallel.

35. The process of claim 29 wherein the compressed gases are subjected to a hydrogenation step prior to entering said Fischer-Tropsch reactor.

36. The process of claim 29 wherein at least a portion of tail gas from said Fischer-Tropsch reactor is recycled to said reactor after separation of hydrocarbons.

37. The process of claim 29 wherein $H_2$ is separated from the tail gas of said Fischer-Tropsch reactor and employed in the hydrogenation step and/or product upgrading.

38. The process of claim 29 wherein the catalyst of said Fischer-Tropsch reactor comprises cobalt.

39. The process of claim 29 wherein the catalyst of said Fischer-Tropsch reactor comprises ruthenium.

40. The process of claim 11 wherein said catalyst is prepared by a method comprising steps of;
   a) dissolving at less than 150 C predetermined quantities of copper and iron in nitric acid to form a solution of ferrous nitrate, ferric nitrate and cupric nitrate;
   b) sparging the solution with oxygen-containing gas during the step of dissolving;
   c) precipitating a catalyst precursor by the addition of sufficient ammonium hydroxide to the solution formed;
   d) removing the ammonium nitrate formed during the precipitation step;
   e) washing the catalyst precursor;
   f) adding by mixing a water slurry containing a potassium carbonate to the catalyst precursor in an amount sufficient to promote the catalyst;
   g) drying the mixed catalyst precursor and potassium carbonate promoter and sizing to a particle size of from about 5 to about 50 microns; and
   h) heating the solids obtained in air to a temperature of about 600 F for a sufficient time to drive off residual moisture to render it suitable for activation and subsequent use in a FT slurry reaction.

41. The process of claim 11 wherein said catalyst is prepared by a method comprising steps of:
   a) dissolving at less than 150 C predetermined quantities of copper and iron in nitric acid to form a solution of ferrous nitrate, ferric nitrate and cupric nitrate;
   b) sparging the solution with oxygen-containing gas during the step of dissolving;
   c) precipitating a catalyst precursor by the addition of sufficient ammonium hydroxide to the solution formed;
   d) washing the catalyst precursor;
   e) adding by mixing a water slurry containing potassium carbonate to the catalyst precursor in an amount sufficient to promote the catalyst;
   f) drying the mixed catalyst precursor and potassium carbonate promoter and sizing to a particle size of from about 5 to about 50 microns;
   g) heating the solids obtained in air to a temperature of about 600 F for a sufficient time to drive off residual moisture; and
   h) activating said catalyst by contacting said catalyst with a mixture of gaseous hydrogen and carbon monoxide at a temperature of about 250 C to 300 C for about 0.5 to 5 hours, with a water vapor partial pressure of about 1 psig, and a hydrogen to carbon monoxide ratio of about 1.3 to 1.5, said activation being effective to increase the selectivity of the activated catalyst in the subsequent formation of liquid hydrocarbons in a FT reaction.

\* \* \* \* \*